(12) United States Patent
Van der Merwe et al.

(10) Patent No.: US 9,450,804 B2
(45) Date of Patent: Sep. 20, 2016

(54) ANYCAST AWARE TRANSPORT FOR CONTENT DISTRIBUTION NETWORKS

(75) Inventors: Jacobus Van der Merwe, New Providence, NJ (US); Zakaria Al-Qudah, Florham Park, NJ (US); Seungjoon Lee, Springfield, NJ (US); Michael Boris Rabinovich, Solon, OH (US); Oliver Spatscheck, Randolph, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1059 days.

(21) Appl. No.: 12/553,769

(22) Filed: Sep. 3, 2009

(65) Prior Publication Data

US 2011/0055316 A1 Mar. 3, 2011

(51) Int. Cl.
G06F 15/173 (2006.01)
G06F 15/16 (2006.01)
H04L 29/08 (2006.01)

(52) U.S. Cl.
CPC ..... H04L 29/08729 (2013.01); H04L 67/1002 (2013.01)

(58) Field of Classification Search
CPC ............... H04L 67/1002; H04L 29/08729
USPC .................. 709/238, 242, 203, 245
See application file for complete search history.

(56) References Cited

U.S. PATENT DOCUMENTS

| | | | |
|---|---|---|---|
| 6,205,481 B1 * | 3/2001 | Heddaya et al. | 709/226 |
| 6,327,252 B1 * | 12/2001 | Silton et al. | 370/256 |
| 6,381,709 B1 * | 4/2002 | Casagrande et al. | 714/18 |
| 6,920,129 B2 | 7/2005 | Preston et al. | |
| 7,254,138 B2 | 8/2007 | Sandstrom | |
| 7,328,009 B2 | 2/2008 | Takeda et al. | |
| 7,330,906 B2 | 2/2008 | Hameleers et al. | |
| 7,343,422 B2 | 3/2008 | Garcia-Luna-Aceves et al. | |
| 7,725,596 B2 * | 5/2010 | Garcia-Luna-Aceves et al. | 709/238 |
| 7,768,939 B1 * | 8/2010 | Trivedi et al. | 370/252 |
| 7,797,426 B1 * | 9/2010 | Lyon | 709/226 |
| 2002/0004846 A1 * | 1/2002 | Garcia-Luna-Aceves et al. | 709/245 |

(Continued)

OTHER PUBLICATIONS

Zakaria Al-Qudah, Seungjoon Lee, Michael Rabinovich, Oliver Spatscheck, and Jacobus Van der Merwe. 2009. Anycast-aware transport for content delivery networks. In Proceedings of the 18th international conference on World wide web (WWW '09). ACM, New York, NY, USA, 301-310. <URL:http://doi.acm.org/10.1145/1526709.1526750>.*

(Continued)

Primary Examiner — Philip Chea
Assistant Examiner — Wing Ma
(74) Attorney, Agent, or Firm — Akerman LLP; Michael K. Dixon; Mammen (Roy) P. Zachariah, Jr.

(57) ABSTRACT

A system for providing content includes a plurality of content delivery servers and a routing control module. Each of the content delivery servers is configured to receive a first request from a client system sent to an anycast IP address for the content, and to provide a first portion of the content to the client system. Each of the content delivery servers is further configured to receive a second request from the client system sent to the anycast IP address for a second portion of the content, and to provide the second portion of the content to the client system. The routing control module is configured to modify the routing of the anycast address from a first content delivery server to a second content delivery server.

20 Claims, 7 Drawing Sheets

(56) References Cited

U.S. PATENT DOCUMENTS

| | | | |
|---|---|---|---|
| 2002/0007413 A1* | 1/2002 | Garcia-Luna-Aceves et al. | 709/229 |
| 2002/0010737 A1* | 1/2002 | Garcia-Luna-Aceves et al. | 709/203 |
| 2002/0016860 A1* | 2/2002 | Garcia-Luna-Aceves et al. | 709/245 |
| 2003/0051016 A1* | 3/2003 | Miyoshi et al. | 709/222 |
| 2003/0105865 A1* | 6/2003 | McCanne et al. | 709/225 |
| 2003/0161321 A1* | 8/2003 | Karam et al. | 370/395.21 |
| 2004/0107234 A1* | 6/2004 | Rajahalme | 709/200 |
| 2004/0165565 A1 | 8/2004 | Omae et al. | |
| 2005/0010653 A1* | 1/2005 | McCanne | 709/219 |
| 2005/0021999 A1* | 1/2005 | Touitou et al. | 713/200 |
| 2005/0044141 A1 | 2/2005 | Hameleers et al. | |
| 2005/0164729 A1 | 7/2005 | Narayanan et al. | |
| 2005/0198367 A1 | 9/2005 | Ettikan | |
| 2006/0018299 A1 | 1/2006 | Yamamoto | |
| 2006/0018317 A1 | 1/2006 | Jimmei | |
| 2006/0193252 A1 | 8/2006 | Naseh et al. | |
| 2006/0209885 A1 | 9/2006 | Hain et al. | |
| 2006/0221866 A1 | 10/2006 | Shepherd | |
| 2006/0236394 A1 | 10/2006 | Morrow et al. | |
| 2007/0044150 A1* | 2/2007 | Dalal | H04L 63/1458 726/22 |
| 2007/0088708 A1 | 4/2007 | R. | |
| 2007/0133539 A1 | 6/2007 | Kang et al. | |
| 2007/0243821 A1* | 10/2007 | Hundscheidt et al. | 455/3.04 |
| 2008/0080513 A1 | 4/2008 | Kang et al. | |
| 2008/0123640 A1 | 5/2008 | Bhatia et al. | |
| 2008/0126529 A1 | 5/2008 | Kim et al. | |
| 2008/0151881 A1* | 6/2008 | Liu et al. | 370/389 |
| 2008/0235400 A1* | 9/2008 | Slocombe et al. | 709/245 |
| 2009/0113057 A1* | 4/2009 | Van der Merwe et al. | 709/227 |
| 2009/0254775 A1* | 10/2009 | Coffey et al. | 714/4 |
| 2009/0319665 A1* | 12/2009 | Moonen | 709/227 |
| 2011/0029596 A1 | 2/2011 | Spatscheck et al. | 709/203 |

OTHER PUBLICATIONS

Jun, H. et al., "Binding clients to replicated servers: initial and Continuous Binding," Distributed Computing Systems, 2003. FTDCS 2003. Proceedings. The Ninth IEEE Workshop on Future Trends of , vol., No., pp. 168,174, May 28-30, 2003. <URL: http://ieeexplore.ieee.org/stamp/stamp.jsp?tp=&arnumber=1204329&isnumber=27118>.*

"Anycast CDNs Revisited," Hussein et al., Case Western Reserve University, Cleveland, OH, AT&T Labs—Research, Florham Park, NJ 07932, WWW 2008, Beijing, China, Apr. 21-25, 2008, pp. 277-286.

* cited by examiner

ANYCAST AWARE TRANSPORT FOR CONTENT DISTRIBUTION NETWORKS

FIELD OF THE DISCLOSURE

The present disclosure generally relates to communications networks, and more particularly relates to anycast aware transport for content distribution networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
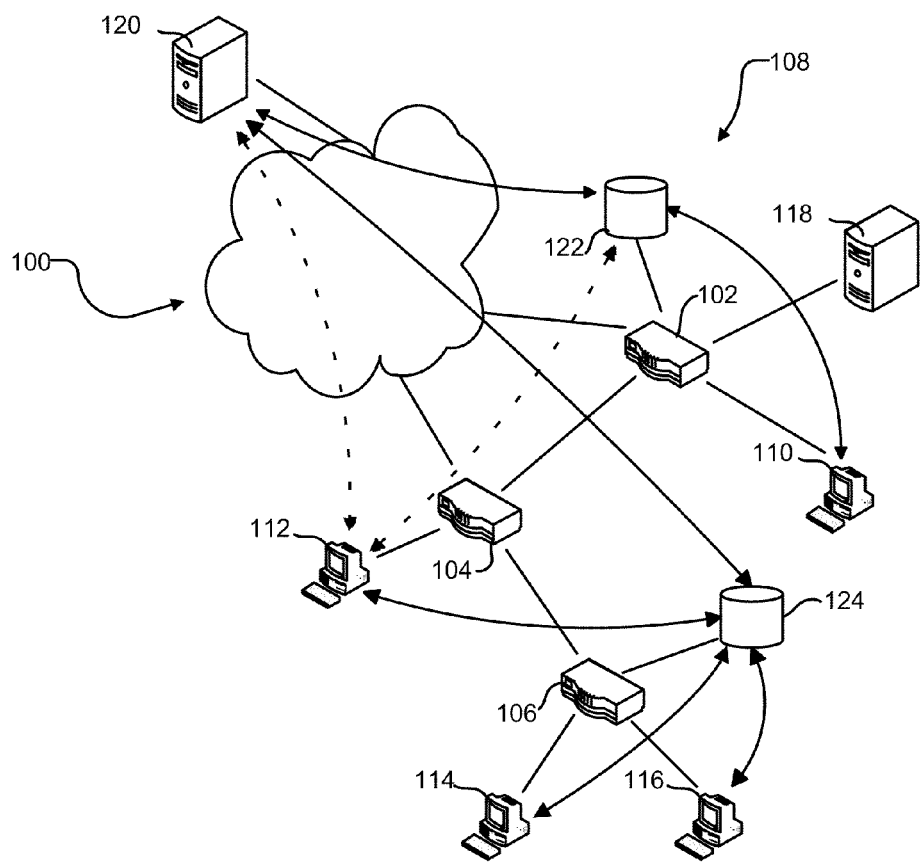
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
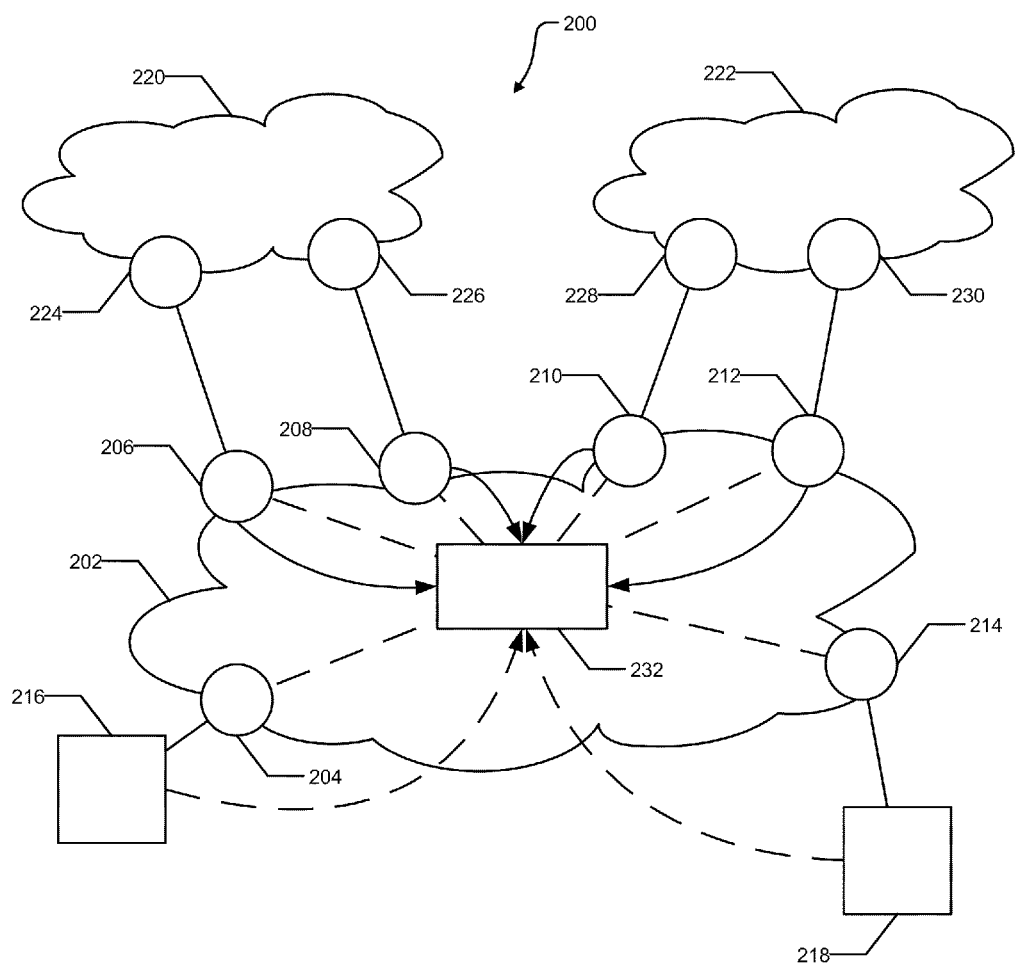
FIG. 2 is block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206 though 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it can be undesirable to provide an anycast addresses to client systems within an unstable network that can be subjected to frequent internal routing changes.

Figure 3:
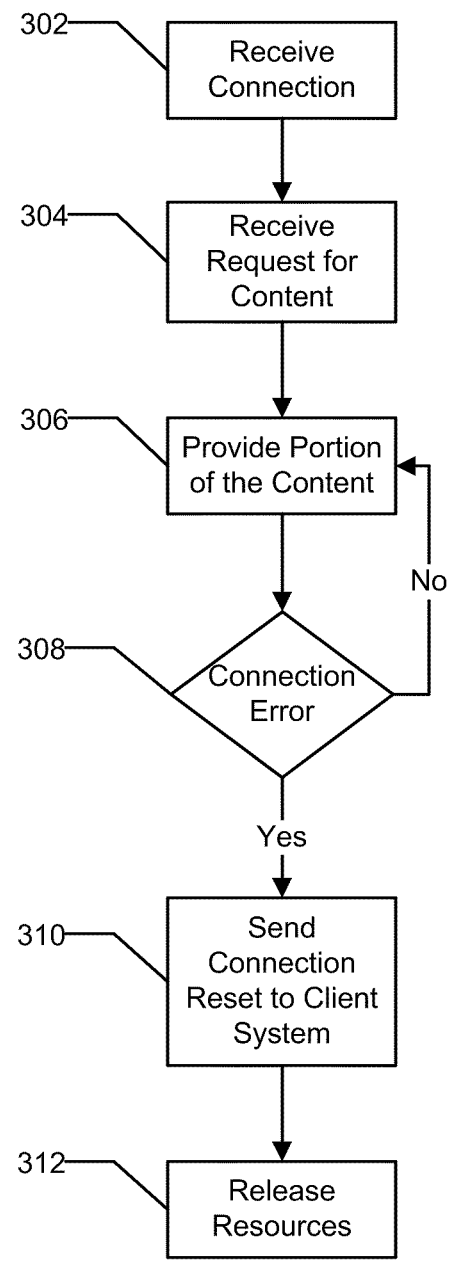
FIGS. 3 and 4 are flow diagrams illustrating exemplary methods of providing content in accordance with embodiments of the present disclosure.

FIG. 3 illustrates an exemplary method of providing content. At 302, a cache server can establish a connection with a client system. For example, a transmission control protocol (TCP) connection can be established using a 3-way handshake. The client system can open the connection by sending a synchronize (SYN) packet to the server. The server can acknowledge the connection request by sending a synchronize-acknowledgement (SYN-ACK) packet to the client system. To fully establish the two-way connection, the client system can respond to the SYN-ACK packet by sending an acknowledgement (ACK) packet to the server.

Once the connection is established, the server can receive a request from the client, as illustrated at 304. The request can include a content identifier that uniquely identifies the content, such as a full path and filename or a unique serial number. At 306, the server can start sending the content to the client system. At 308, the server can determine if a connection error has occurred. In an embodiment, a connection error may occur when the routing for an anycast address is modified such that packets sent from the client system to the anycast address are directed to another server. Alternatively, a connection error may occur if there is a temporary loss of connectivity between the client system and the server, for example if a link in the path is saturated or reset and packets are dropped.

When a connection error has not occurred, the server can continue to send the content, as illustrated at 306. Alternatively, at 308, when a connection error has occurred, the server can send a connection reset to the client system.

Additionally, at 310, the server can release resources reserved for providing content to the client system.

Figure 4:
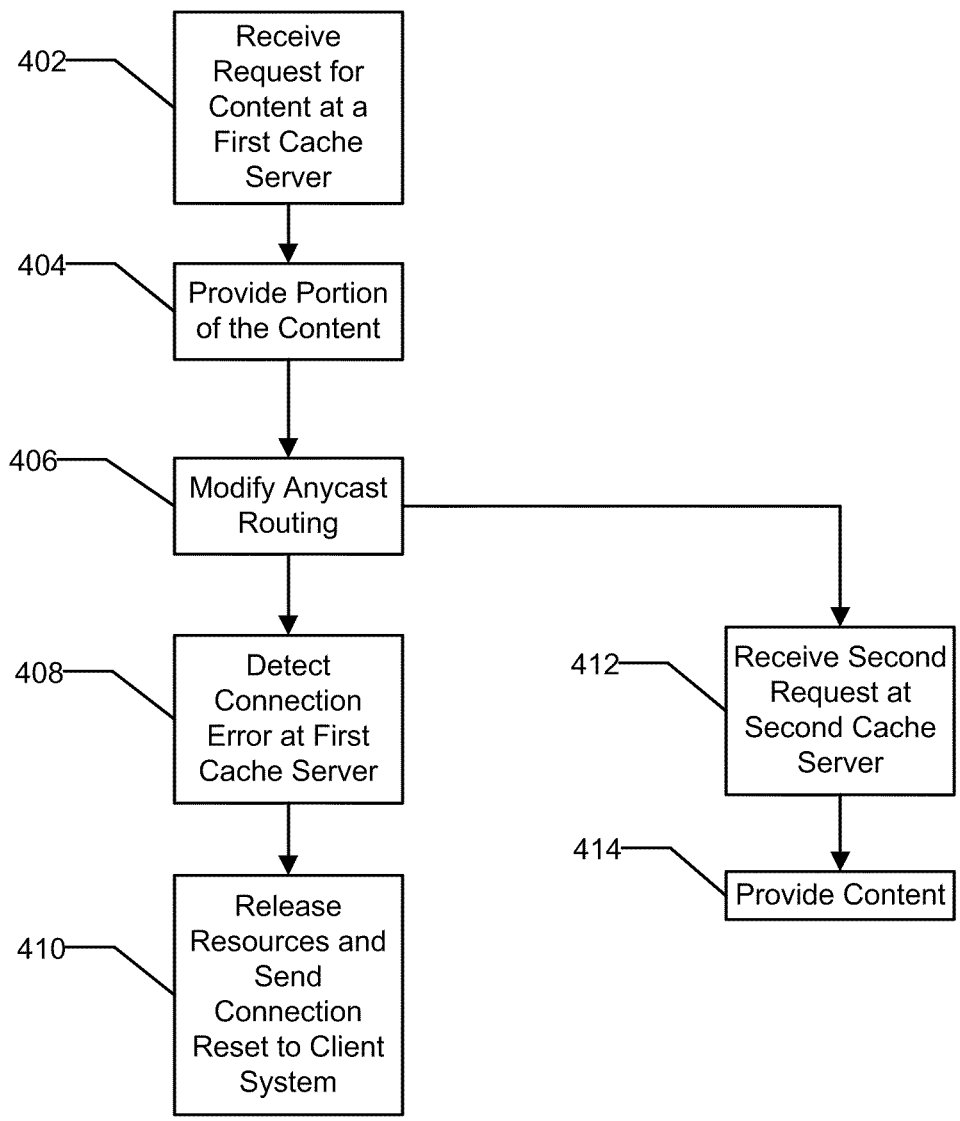

FIG. 4 illustrates another embodiment of providing content through a content delivery network such as content delivery network 200. At 402, a content delivery module can receive a request for content. The content delivery module can include a first cache server, such as cache server 112. The request for the content can be sent to an anycast IP address for the content delivery network and the request can be directed to the first cache server, based on the least cost routing of the network. In response to the request, at 404, the first cache server can provide a portion of the content to the client system.

At 406, a routing control module can modify the anycast routing. As a result of the modification, packets from the client system sent to the anycast address can be routed to a second cache server of the content delivery module instead of being routed to the first cache server. Consequently, any acknowledgements sent from the client system to the first cache server will be routed to the second cache server.

At 408, the first cache server may detect a connection error, such as by failing to receive an acknowledgement from the client system. In an embodiment, the first cache server may attempt to resend a lost packet to the client system a limited number of times. For example, the first cache server may attempt to retry sending the content not more than once. Alternatively, the first cache server may not attempt to resend the lost packet to the client system. At 410, the first cache server can release the resources reserved for providing the content to the client system. Additionally, the first cache server may send a connection reset to the client system, indicating that the first cache server is closing the connection.

At 412, a second cache server may receive a second request from the client system for a second portion of the content. The second request may include a range request indicating the beginning of the second portion of the content. In an embodiment, the client system can send the second request in response to receiving a connection reset from the first client system. In an embodiment, when the second cache server receives an acknowledgement for content sent from the first cache server to the client system, the second cache server can send a connection reset, resulting in the client system sending the second request. At 414, the second server can provide the second portion of the content to the client system.

In an embodiment, the second server can skip a slow-start phase when providing the second portion of the content. Typically, a TCP connection may be established with a small congestion window, such as one or two segments. During the slow-start phase, the congestion window can be rapidly increased each time an acknowledgement is received, until a threshold is reached, or a loss occurs. The TCP connection may then enter into a congestion avoidance phase, slowly increasing the congestion window when an acknowledgement is received, or returning the size of the congestion window to the threshold when a loss occurs. When the second server skips the slow-start phase, the second server may initiate the transfer in the congestion avoidance phase at the threshold. In an alternate embodiment, the second server may initiate the slow-start phase using a higher initial congestion window when providing the second portion of the content.

The content delivery module and the routing control module can be implemented in hardware, software, or any combination thereof. Each module may include one or more computer systems. When a module includes more than one computer system, the functions of the module can be distributed across the multiple computer systems in a symmetric manner, such as where each computer system performs the same type of tasks, or in an asymmetric manner, such as where two computer systems of the module may perform different tasks.

Figure 5:
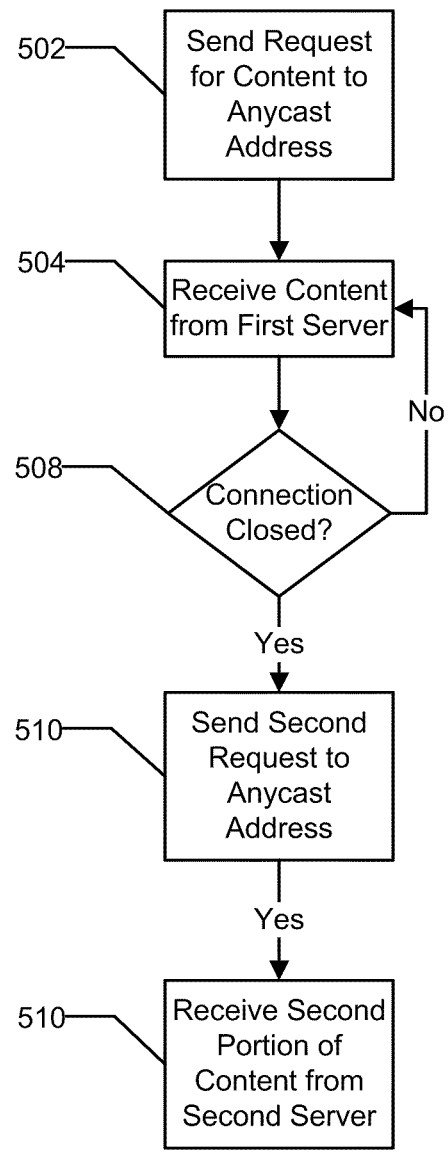
FIG. 5 is a flow diagram illustrating a method of receiving content in accordance with one embodiment of the present disclosure.

FIG. 5 illustrates an exemplary method of receiving content from an anycast aware content delivery network. At 502, a client system can send a request for content to an anycast address for the content delivery network. As a result of the least cost routing, a first cache server responding to the anycast address can receive the request. At 504, the client system can receive content from the first cache server. At 506, the client system can determine if a connection error has occurred. In an embodiment, a connection error can occur when the content delivery network alters the routing of the anycast address such that packets sent from the client system to the anycast address are directed to a second cache server instead of the first cache server. The client system can detect the network error when the client system fails to receive additional content packets from the first cache server for a period of time. Additionally, the client system can detect the network error when the client system receives a connection reset. In an embodiment, the first cache server can send a connection reset to the client system when it fails to receive an acknowledgement from the client system for a period of time. Additionally, the second cache server may send a connection reset when the second cache server receives an acknowledgement that was intended for the first cache server.

When a connection error has not occurred, the client system can continue to receive content from the first cache server, as illustrated at 504. Alternatively, when a connection error is detected, the client system can send a second request to the anycast address. The second request can include a range request identifying a second portion of the content. When the connection error occurred as a result of a change in the routing for the anycast IP address, the second request can be received by the second cache server. At 510, the client system can receive the second portion of the content from the second cache server.

In an embodiment, the client system may terminate the download if a connection error occurs during initiating the connections, such as during the three-way handshake.

Figure 6:
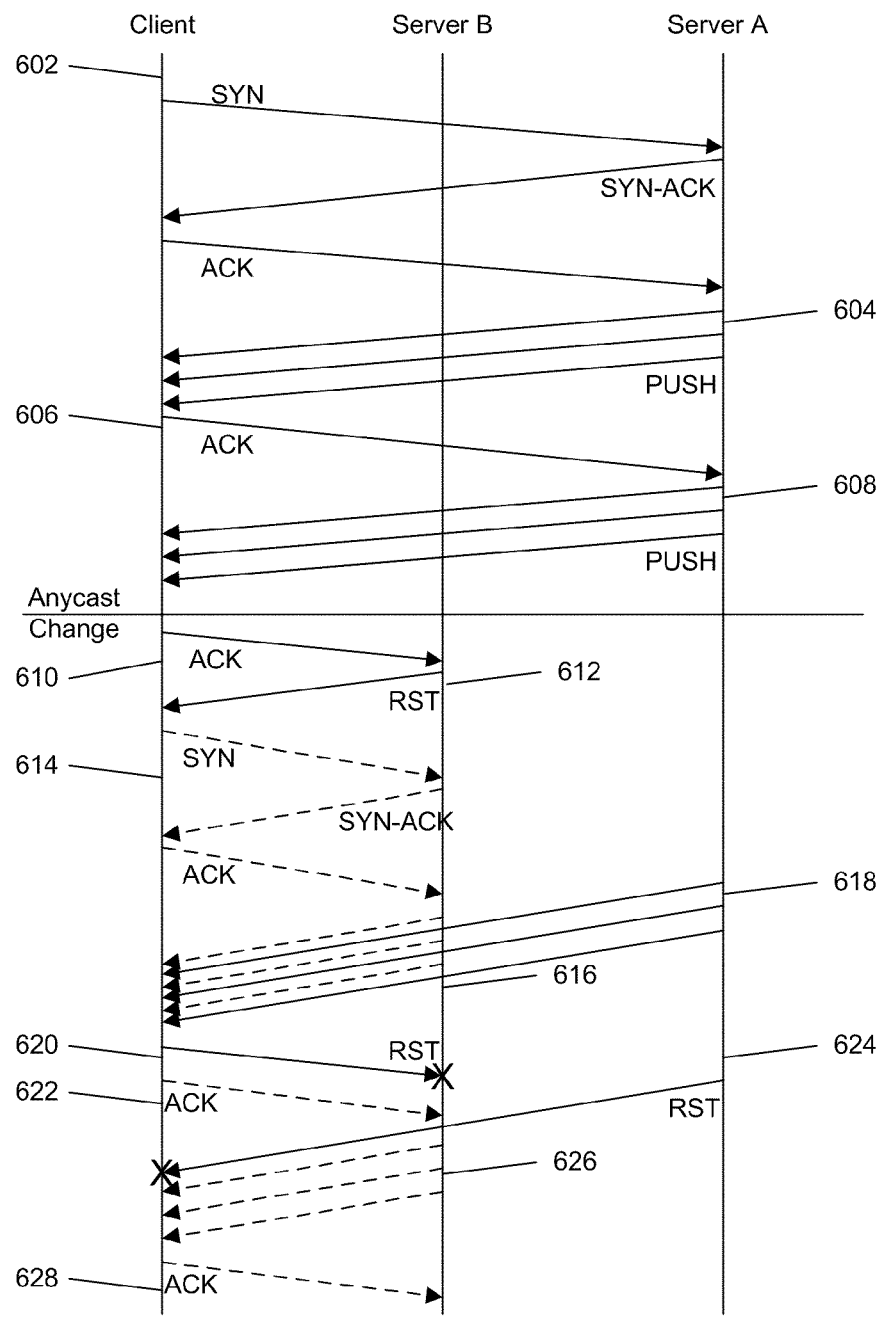
FIG. 6 is a timing diagram illustrating an exemplary process for providing content to a client system.

FIG. 6 is a timing diagram illustrating the communication between a client system and two cache servers according to an exemplary embodiment. At 602, the client system can initiate a TCP connection with server A using the anycast address. Establishing the TCP connection between the client system and server A can require a three way handshake. At 604, server A can initiate a transfer of the requested content to the client system by sending a series of data packets to the client system. At 606, the client system can acknowledge receipt of the series of data packets. Upon receiving the acknowledgment, server A can send additional data packets to the client system at 608. At 610, the client system can send an acknowledgement for the additional data packets. A change to the anycast routing can occur prior to server A receiving the acknowledgement of the additional data packets, resulting in the acknowledgement from the client system going to server B. At 612, server B can respond to the unexpected acknowledgement with a connection reset message.

At 614, the client system, in response to the connection reset message, can initiate a connection with server B using the anycast IP address. At 616, server B can provide the content to the client system by sending a series of data packets. The client system can acknowledge the receipt of the data packets at 622. Transmission of the content from server B to the client system can continue with additional data packets being sent by server B and additional acknowledgements being sent by the client system, at 626 and 628 respectively.

Further, after failing to receive an acknowledgement of the data sent at 608, server A can attempt to resend the data at 618. As the client system has already closed the connection in response to the reset sent from server B at 612, the client system can send a connection reset message at 620. However, because the connection reset message is routed to server B, server A may never receive the connection reset message. As a result of not receiving an acknowledgement from the client system, server A can close the connection rather than continuing to resend the data. Additionally, server A can send a connection reset to the client system and release the resources reserved for providing the content. The client system can ignore the connection reset message when the connection is already closed.

Figure 7:
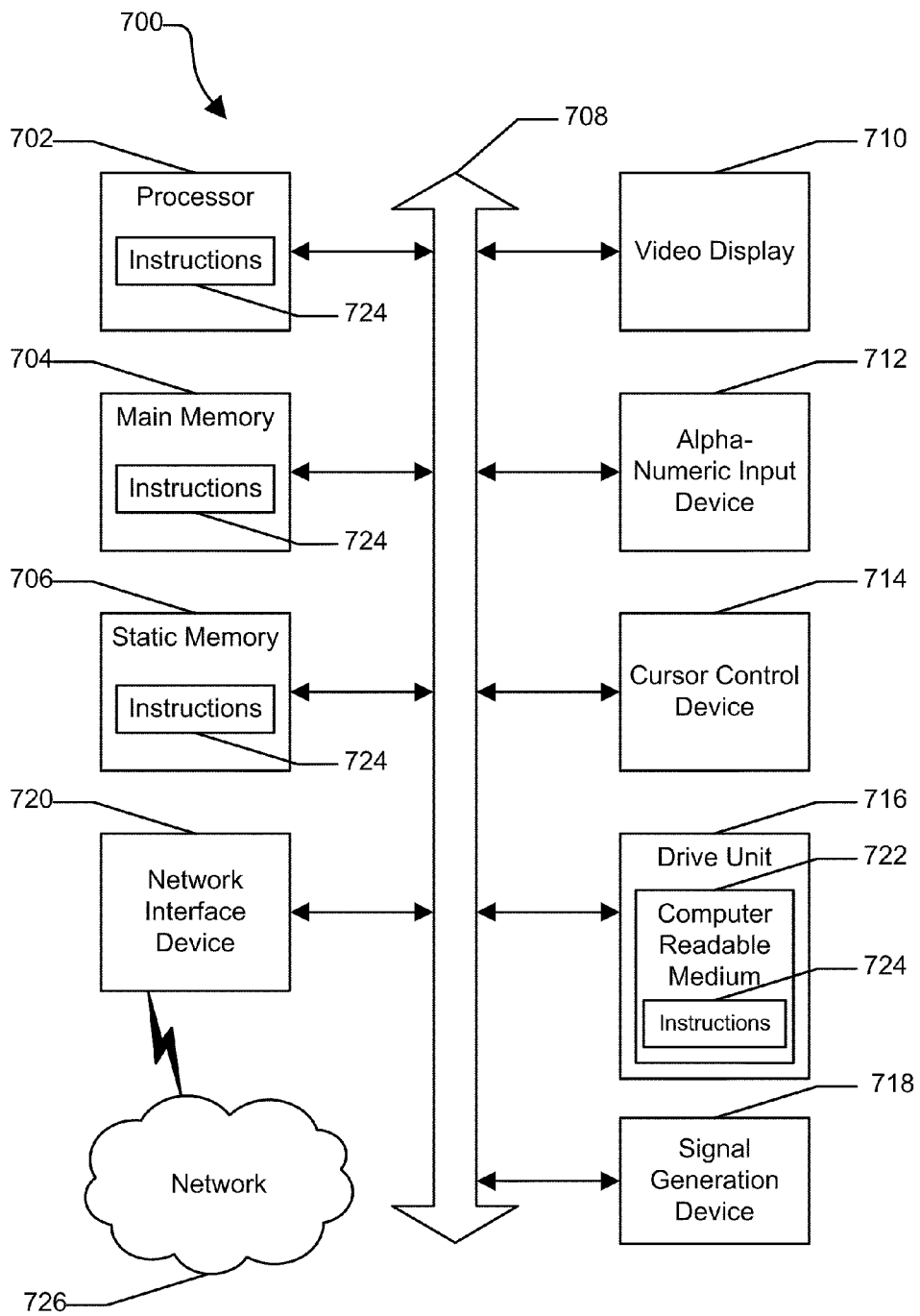
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system for providing content, comprising:
a first hardware content delivery server comprising:
   a first memory that stores first instructions;
   a first processor that executes the first instructions to perform first operations, the first operations comprising:
      receiving, from a client system, a request for the content that is sent to an anycast internet protocol address;
      establishing a connection between the first hardware content delivery server and the client system;
      providing a first portion of the content through the connection to the client system;
      identifying a connection error; and terminating the connection to the client system in response to identifying the connection error; and
a second content delivery server comprising:
a second memory that stores second instructions;
a second processor that executes the second instructions to perform second operations, the second operations comprising:
receiving an unexpected acknowledgement from the client system;
sending a first connection reset message to the client system in response to the unexpected acknowledgement;
receiving a second request from the client system sent to the anycast internet protocol address for a second portion of the content in response to the first connection reset message, wherein the second request includes a range request for the second portion of the content; and
providing the second portion of the content, wherein a slow-start phase is skipped when providing the second portion of the content, wherein a second connection reset message sent by the first hardware content delivery server is ignored when the connection between the first hardware content delivery server and the client system is closed.

2. The system of claim 1, wherein identifying a connection error includes failing to receive a confirmation in response to sending a content packet.

3. The system of claim 2, wherein identifying a connection error further includes resending the content packet not more than once.

4. The system of claim 1, wherein the range request identifies the second portion of the content.

5. The system of claim 1, wherein the connection error is a result of a routing change.

6. The system of claim 1, wherein the range request indicates a beginning of the second portion of the content.

7. A method for providing content, comprising:
receiving, from a client system, a request for the content that is sent to an anycast internet protocol address;
establishing a connection between a first content delivery server and the client system;
providing a first portion of the content through the connection to the client system;
identifying a connection error;
terminating, by utilizing first instructions from a first memory that are executed by a first processor of the first content delivery server, the connection to the client system in response to identifying the connection error;
receiving an unexpected acknowledgement from the client system;
sending, by utilizing second instructions from a second memory that are executed by a second processor of a second content delivery server, a first connection reset message to the client system in response to the unexpected acknowledgement;
receiving a second request from the client system sent to the anycast internet protocol address for a second portion of the content in response to the first connection reset message, wherein the second request includes a range request for the second portion of the content; and
providing the second portion of the content, wherein a slow-start phase is skipped when providing the second portion of the content, wherein a second connection reset message sent by the first content delivery server is ignored when the connection between the first content delivery server and the client system is closed.

8. The method of claim 7, wherein identifying a connection error includes failing to receive a confirmation in response to sending a content packet.

9. The method of claim 8, wherein identifying a connection error further includes resending the content packet not more than once.

10. The method of claim 7, wherein the range request identifies the second portion of the content.

11. The method of claim 7, wherein the connection error is a result of a routing change.

12. The method of claim 7, wherein range request indicates a beginning of the second portion of the content.

13. A computer-readable storage device for providing content, the computer-readable storage device comprising first instructions, which when loaded and executed by a first processor of a first content delivery server, cause the first processor to perform first operations, the first operations comprising:
receiving, from a client system, a request for the content that is sent to an anycast internet protocol address;
establishing a connection between the first content delivery server and the client system;
providing a first portion of the content through the connection to the client system;
identifying a connection error; and
terminating the connection to the client system in response to identifying the connection error; and
wherein the computer-readable storage device further comprises second instructions, which when loaded and executed by a second processor of a second content delivery server, cause the second processor to perform second operations, the second operations comprising:
receiving an unexpected acknowledgement from the client system;
sending a first connection reset message to the client system in response to the unexpected acknowledgement;
receiving a second request from the client system sent to the anycast internet protocol address for a second portion of the content in response to the first connection reset message, wherein the second request includes a range request for the second portion of the content; and
providing the second portion of the content, wherein a slow-start phase is skipped when providing the second portion of the content, wherein a second connection reset message sent by the first hardware content delivery server is ignored when the connection between the first hardware content delivery server and the client system is closed.

14. The computer-readable storage device of claim 13, wherein identifying a connection error includes failing to receive a confirmation in response to sending a content packet.

15. The computer-readable storage device of claim 14, wherein identifying a connection error further includes resending the content packet not more than once.

16. The computer-readable storage device of claim 13, wherein the range request identifies the second portion of the content.

17. The computer-readable storage device of claim 13, wherein the connection error is a result of a routing change.

18. The computer-readable storage device of claim 13, wherein range request indicates a beginning of the second portion of the content.

19. The computer-readable storage device of claim 13, wherein the second operations further comprise initiating transfer of the second portion of the content in a congestion avoidance phase.

20. The method of claim 7, wherein the second operations further comprising initiating transfer of the second portion of the content in a congestion avoidance phase.

* * * * *